United States Patent
Koslow

(10) Patent No.: US 6,889,599 B2
(45) Date of Patent: May 10, 2005

(54) BREWING APPARATUS AND METHOD

(75) Inventor: Evan E. Koslow, Weston, CT (US)

(73) Assignee: Koslow Technologies Corporation, Orange, CT (US)

(*) Notice: Subject to any disclaimer, the term of this patent is extended or adjusted under 35 U.S.C. 154(b) by 0 days.

(21) Appl. No.: 10/125,723

(22) Filed: Apr. 16, 2002

(65) Prior Publication Data

US 2003/0192434 A1 Oct. 16, 2003

(51) Int. Cl.[7] .............................................. A47J 31/00
(52) U.S. Cl. ......................... 99/306; 99/322; 219/689; 426/433
(58) Field of Search ....................... 99/306, 305, 304, 99/317, 316, 322; 219/689; 426/433, 432

(56) References Cited

U.S. PATENT DOCUMENTS

| 4,354,427 A | 10/1982 | Filipowicz et al. |
|---|---|---|
| 4,386,109 A | 5/1983 | Bowen et al. |
| 4,577,080 A * | 3/1986 | Grossman ................ 99/306 X |
| 4,646,562 A | 3/1987 | Cronan |
| 4,721,835 A | 1/1988 | Welker |
| 4,767,539 A | 8/1988 | Ford |
| 4,867,880 A | 9/1989 | Pelle et al. |
| 5,012,059 A | 4/1991 | Boatman |
| 5,243,164 A * | 9/1993 | Erickson et al. .......... 99/306 X |
| 5,543,087 A | 8/1996 | Lee et al. |
| 5,545,879 A | 8/1996 | Brotz |
| 6,079,314 A | 6/2000 | Mackinnon |
| 6,162,360 A | 12/2000 | Ho et al. |
| 6,245,371 B1 | 6/2001 | Gutwein et al. |
| 6,352,644 B1 | 3/2002 | Hawthorne et al. |

FOREIGN PATENT DOCUMENTS

EP 806 167 A1 11/1997

* cited by examiner

Primary Examiner—Reginald L. Alexander
(74) Attorney, Agent, or Firm—KX Industries, L.P.; Shirley S. Ma

(57) ABSTRACT

An apparatus and method useful for brewing a beverage. A brewing liquid, generally water, and in some cases brewing ingredients, are placed in a container having a bottom with openings that, due to surface tension of the liquid, do not allow the liquid to pass through the openings until the liquid approaches or reaches its boiling point. The liquid is heated to approach its boiling point by placing the apparatus in a microwave oven or by the use of an electrical resistance heater associated with the container. The brewed beverage is captured in a second, temporary container from which it may be consumed or served.

19 Claims, 3 Drawing Sheets

BREWING APPARATUS AND METHOD

BACKGROUND OF THE INVENTION

1. Field of the Invention

This invention relates to beverage brewing systems. More particularly, it relates to systems and methods for rapidly and efficiently brewing beverages such as coffee, tea and hot chocolate, including systems that can do so using a microwave oven.

2. Prior Art

There are many systems that are being marketed for the brewing of beverages, including coffee. These items are ubiquitous in homes and offices. In general, they work well. If good quality ingredients are used, a good quality product is produced. However, there is a considerable amount of labor involved in placing the ingredients in a filter located in a brewing basket, measuring out the proper amount of water and pouring the water into the system. Some brewing apparatuses overcome some of these problems, such as eliminating the need to measure water, by connecting directly to a source of water such as the plumbing in a home or office, or to a purified water bottle. Such systems are expensive to install or may take up a great deal of space and require that large and heavy water bottles be handled.

Another disadvantage of these systems is that in general, the water is not heated instantaneously. Thus, there is a long delay between when the brewing of a new batch of beverage is initiated, and the time when it is completed. First, there is a time delay in heating the water. Then, there is a time delay as the water drips through the brewing ingredients and the containment filter (the filter, generally made of paper or another suitable material, that retains the brewing ingredients during brewing). It may take between five and eight minutes before a new batch of coffee is available.

Accordingly, there is a need for a brewing apparatus and a brewing method which reduces the labor required to brew the beverage, and brews the beverage quickly and efficiently.

SUMMARY OF THE INVENTION

It is an object of the present invention to provide a brewing apparatus and a brewing method that provide for brewing coffee or other beverages quickly and efficiently using an extremely simple and inexpensive system with no moving parts and that eliminate many of the components used to heat, pump, and maintain the beverage.

It is a further object of the invention to provide a brewing apparatus and method wherein the components are reusable.

It is yet another object of the invention to provide a brewing system and method which can be used in a microwave oven environment.

In accordance with one embodiment of the invention, the brewing system comprises a brewing basket in the form of a reservoir in which brewing ingredients are received. The reservoir has brewing ingredients supporting a lower surface having openings or pores therein in the order of 10 to 200 microns in diameter, and should be formed of a material that is slightly to significantly hydrophobic. The pores have characteristics so that surface tension of a brewing liquid (generally water) supports the liquid in the reservoir when the liquid is at an initial temperature (tap or room temperature), and allows the liquid to drain through the pores when the liquid is at a temperature which approaches or is at the boiling point of the liquid. The pores are sized, shaped and interconnected to perform this function. The supporting surface may be formed from a polymer and be in an integral part of the brewing basket. Alternatively, the supporting surface may be formed of a corrosion resistant metal such as 410 series or 316 series stainless steel having a thickness of approximately 0.75 mm. If the metal is imbedded at its edges in a polymer, ceramic, glass or other dielectric insulator material from which the brewing basket is formed, in general, the metal will not cause difficulties due to arcing or sparking when the apparatus is placed in a microwave oven.

The reservoir is preferably configured to be received directly by a beverage receiving container, such as a cup, mug or carafe.

In accordance with another embodiment of the invention, the reservoir, having the porous surface described above, receives the brewing liquid, but not the brewing ingredients. The reservoir is received above a brewing basket, which holds the brewing ingredients therein with a suitable screen, mesh or ingredient containment filter, of a type well known in the art. The brewing basket is in turn received in a beverage receiving container, such as a cup, mug or carafe.

In accordance with one aspect of the method of the invention, brewing ingredients (active flavor material) and a brewing liquid (generally water) are placed in a brewing basket or reservoir having the general structure set forth above. The brewing basket is placed over a second container to receive the brewed beverage product. Water is added to the brewing basket from the top, thus exposing the water to the brewing ingredients. The water is then heated by a heater associated with the brewing basket or by placing the entire apparatus in a microwave oven. As the water temperature increases and approaches the boiling point of water, its surface tension decreases significantly. The water, which up until this time is held within the brewing basket with the brewing ingredients so that the beverage can brew, then drains rapidly through the openings in the supporting surface, due to the much lower surface tension, and rapidly deposits the brewed liquid in the container for the brewed beverage.

In accordance with another aspect of the method of the invention, the reservoir receives only the brewing liquid. The reservoir is received directly above a brewing basket. The brewing ingredients are placed in a brewing basket, which in turn is received directly above a beverage receiving container. When the brewing liquid is heated and approaches or reaches its boiling point, it is released into contact with the brewing ingredients. The brewed liquid is then received in the beverage receiving container.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
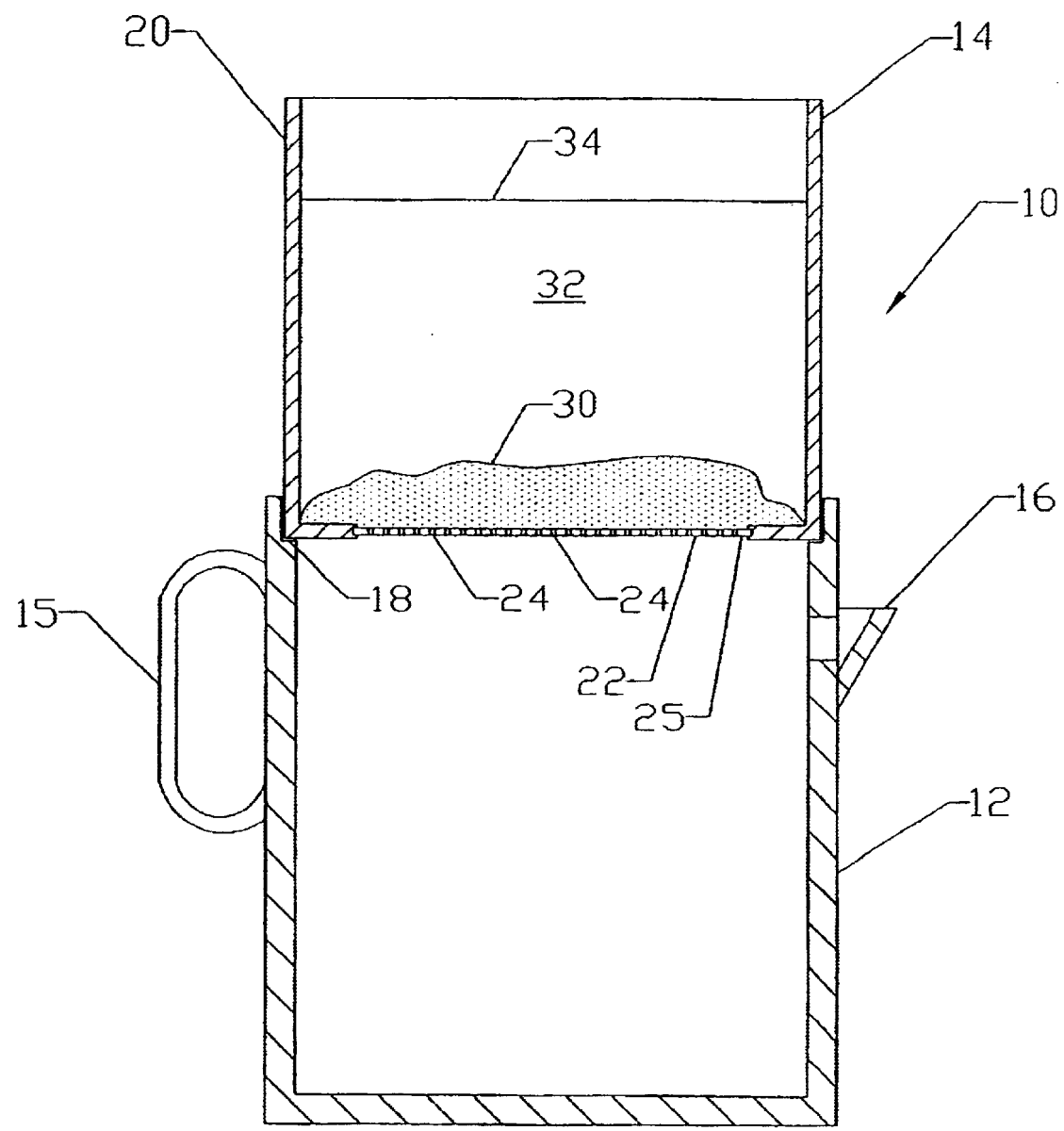
FIG. 1 is a cross-sectional view of a first embodiment of a brewing apparatus in accordance with the invention.

Referring to FIG. 1, there is shown a cross-sectional view of an apparatus 10 incorporating features of the present invention. Although the present invention will be described with reference to the embodiments shown in the drawings and described below, it should be understood that the present invention can be embodied in many alternate forms of embodiments. In addition, any suitable size, shape or type of elements or materials could be used.

Brewing apparatus 10 includes a brewed beverage container 12 and a brewing basket 14. While shown as being of a generally cylindrical shape or cup shape, container 12 can have a variety of shapes, such as that of a carafe, or that of a coffee pot. Container 12 of FIG. 1 may have a handle 15 and a spout 16 to permit a beverage which has been brewed to be poured into another container, such as a drinking glass or cup (not shown) generally when brewing basket 14 has been removed from the top of container 12. Alternatively, container 12 may be generally in the form of a simple mug or cup for receiving an appropriate quantity of beverage, and from which the consumer can drink directly.

Brewing basket 14 may be placed securely on top of container 12 by fitting within an annular shoulder 18 of container 12. The fit of brewing basket 14 within shoulder 18 is such that brewing basket 14 is securely held, but is readily removed therefrom. Alternatively, if container 12 is generally in the form of a simple cup, brewing basket 14 may be formed with an annular shoulder (not shown), so as to be received securely in position over container 12.

Brewing basket 14 has a cylindrical sidewall 20 and a bottom wall 22. Bottom wall 22 is provided with a multitude of small apertures or pores 24, each having a diameter of approximately 10 to 200 microns (or preferably 10 to 100 microns), and is slightly to significantly hydrophobic. In one construction, the sidewall 20 and bottom wall 22 are integrally formed, such as, for example, by injection molding of a polymer. The polymer can be a polymer, such as a polyolefin, and in particular polypropylene, or other suitable material.

Alternatively, the portion of bottom wall 22 having apertures 24 may be formed of a corrosion resistant metal insert or plate 25. For example a 316 series or 410 series stainless steel insert, including a metal mesh with appropriate mesh size, may be provided. In general, the thickness of the bottom wall 22 will be approximately 0.25 mm to 2.0 mm. If a metal insert is used, it should be embedded in the polymer around its periphery so as to form a watertight seal and to prevent difficulties due to arcing or sparking when system 10 is placed in a microwave oven, to brew a beverage, in the manner described below.

In use, brewing basket 14 is placed in position on top of container 12. A quantity of brewing ingredients 30, such as, for example, ground coffee beans, is placed within brewing basket 14. A quantity of water 32 appropriate for the amount of brewing ingredients 30, is added up to a level 34.

Apparatus 10 may then be placed within a microwave oven (not shown). The microwave oven may then be set to heat the brewing ingredients 30 and the water 32 for at least as long as it is a necessary for the temperature of water 32 to closely approach the boiling point of water. Water 32 will remain within brewing basket 14 for this pre-boiling period of time allowing brewing of the desired beverage to occur. The water is held within brewing basket 14 by surface tension. The relationship between the pressure of the head or column of water in brewing basket 14 and the size of the pores 24 is given by:

$$\Delta p = (2 \cos \Phi \sigma)/r$$

where:
$\sigma$=surface tension of the water;
$\Phi$=wetting contact angle;
r=pore radius; and
$\Delta p$=pressure generated by the water column of a height that will not penetrate a non-wetting pore.

In the case of a hydrophobic material, $\cos \Phi = 1$. In accordance with this relationship, if the height of the water is increased by a factor of three, the radius of the pores must be reduced by a factor of three to support the water until it nears the boiling point.

When water 32 approaches (and especially when it reaches) its boiling point, its surface tension effectively decreases to a much smaller value. At that time, the brewed liquid is released through openings 24 into container 12, because $2\sigma/r$ is then much lower than $\Delta p$ (the head of water within the brewing basket 14). System 10 may be removed from the microwave oven. Brewing basket 14 is removed from the top of container 12 and container 12 may be used to pour the brewed beverage into cups or glasses for consumption. Brewing basket 14 may then be cleaned of the remainder of brewing ingredients 30 and is available for further use.

Figure 2:
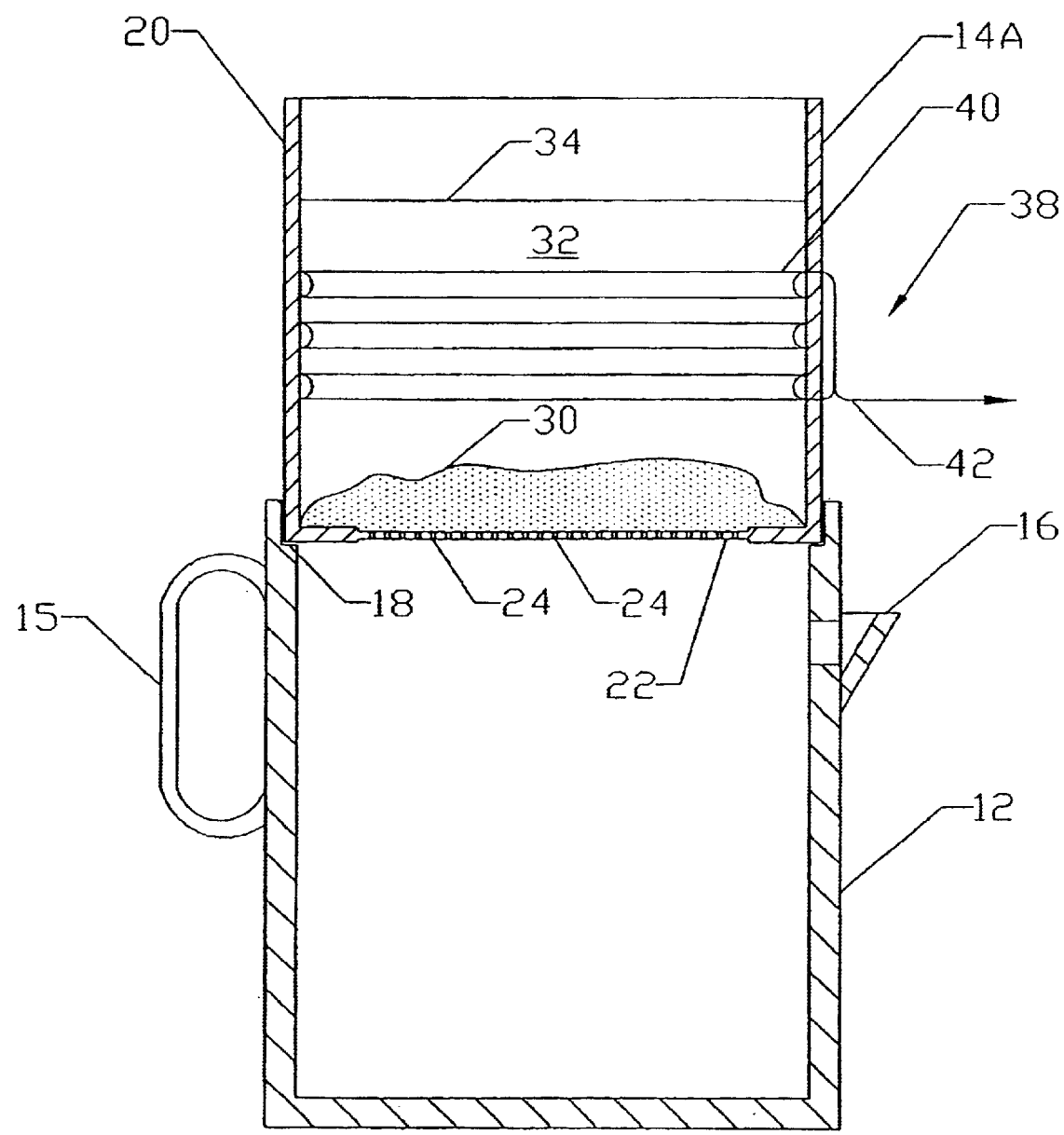
FIG. 2 is a cross-sectional view of a second embodiment of a brewing apparatus in accordance with the invention.

Referring to FIG. 2 (wherein like components have like reference numerals to those described with reference to FIG. 1) a system 38, in accordance with the invention, but not designed for use in a microwave oven environment, is illustrated. An alternative means for heating the water 32 is provided. In particular, a heating coil 40 may be associated with wall 20 of a brewing basket 14A, which can be of an all-metal, ceramic, glass or other construction, including a construction having a metal interior liner, a polymer exterior, and an insulating layer therebetween. A conventional power cord 42 may be connected to an electrical outlet to provide power to heating coil 40 to heat water 32. The operation of this modified system is identical to that disclosed above, except that a microwave oven is not required. However, this modified system may require a slightly longer amount of time in order for the water 32 to reach its boiling point, and for the beverage to be brewed.

A heating element may also be associated with bottom wall 22. The temperature of the water near bottom wall 22 can thus most closely approach the boiling temperature of the water, while the remainder of the water is at a slightly lower temperature, which maybe more advantageous for brewing of a product with optimal taste.

It will be recognized that it may be convenient to provide a system 10 including a microwave brewing basket 14 which does not include a heating coil 40, and a separate brewing basket 14A to be used without a microwave oven and thus including a heating coil 40.

Figure 3:
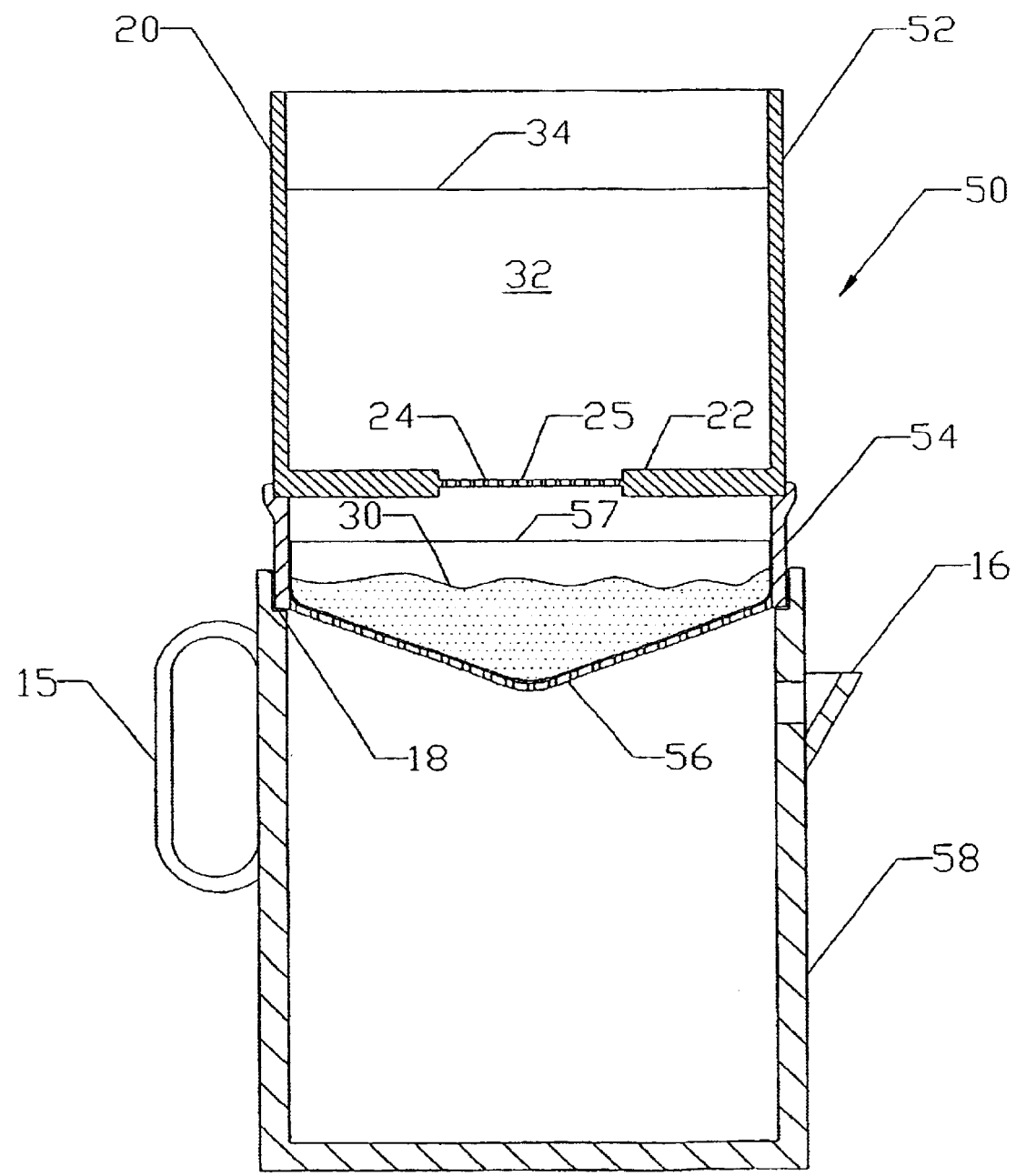
FIG. 3 is a cross-sectional view of a third embodiment of the invention.

Referring to FIG. 3, a system 50 in accordance with another embodiment of the invention includes a water reservoir 52, having a porous bottom wall or an inset or plate 25, as described above. A brewing basket 54, that is designed to hold brewing ingredients 30, is configured to receive at its top, reservoir 52. Brewing basket 54 has at its bottom a filter or a mesh 56, of a type well known in the art, having a generally concave shape to provide a region that supports brewing ingredients 30, but permits the passage of a brewed liquid. Alternatively, at least one opening through which the brewed beverage may pass is provided, and a brewing ingredient containment filter 57, generally formed of paper, may be provided. A beverage receiving container 58 upon which brewing basket 54 may be placed, receives brewed beverage from brewing basket 54, which has passed through mesh 56.

System 50 is used by first placing brewing ingredients into brewing basket 54. Brewing basket 54 is then placed on top of container 58. Reservoir 52 is then placed over brewing basket 54. Water at room or tap temperature, in an amount appropriate for brewing with brewing ingredients 30, is then placed in reservoir 52. The entire assembly is then placed in a microwave oven, and the microwave oven is turned on. When the temperature of the water approaches or reaches its boiling point, water is released from reservoir 52 into brewing basket 54, as described above with respect to the embodiments of FIG. 1 and FIG. 2. Although brewing does not begin until water is released from reservoir 52 into brewing basket 54, the brewing time is not lengthened appreciably because the water is heated rapidly by the microwave oven, and quickly comes into contact with brewing ingredients 30.

In summary, the present invention provides an apparatus to quickly and efficiently brew a beverage. No moving parts are used. The flow of the brewing liquid does not follow a tortuous path as in some brewing equipment, but moves directly downward under the influence of gravity. The apparatus is reusable. In at least one embodiment, most of the brewing takes place at a temperature below boiling, while the brewing liquid is being heated, generally from room, or faucet tap temperature, because the brewing liquid and the brewing ingredients are in the brewing basket while the brewing liquid is being heated. As soon as the temperature of the brew approaches boiling, it is available for immediate consumption, without further delay. The apertures of the porous member are precisely engineered to assure that the brewing liquid is at a selected temperature, or within a closely controlled temperature range, during the time that the brewing liquid is in contact with the brewing ingredients.

Various modifications of the invention are possible. The pores or openings in the surface of the lower wall of the brewing basket may be of various geometries. Rather than being circular, as assumed by the analysis set forth above, the openings maybe rectangular, such as those found in a filter mesh, or may have the shape of other regular or irregular polygons. Further, the cross sectional area may vary as a function of depth through the material. For example, the openings may be tapered to be larger toward the top than at the bottom. It is also possible that the openings be tapered to have the largest cross sectional area at the top and at the bottom, with the cross sectional area being reduced at approximately the center of the thickness of the material.

The ratio of the area that is open to that of the surrounding material may be adjusted. For example, the openings may be of hexagonal shape so that the material appears to have a honeycomb structure with the ends of the cells being at the upper and lower surfaces of the member. In this case the percentage of open area may be large, thus facilitating rapid flow of the brewing liquid once the surface tension is reduced due to heating. For enhanced control, the cross sectional area of the cells may also be tapered, as described above.

The openings or pores may also be arranged in various geometrical patterns such as rings and the size and shapes of the openings in one ring may be different than that in another. This may be especially useful if different brewing liquids are to be used at different temperatures. A single brewing basket or withholding reservoir may thus be useful for a series of different applications.

In yet another variation, rather than being planar, the lower wall (or a plate 25 or member therein) may have a curved, cone shaped, or other geometry. Again, the size and shape of the pores may be varied with position thus increasing the versatility of the brewing basket or water reservoir. Bands of openings interspersed with regions without openings may be provided. If the lower wall of the brewing basket has a plate 25 or a mesh, it may be made by a variety of methods well known in the art, including electroforming.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An apparatus for brewing a beverage, comprising:
    a reservoir for receiving a liquid, said reservoir having a hydrophobic surface, at least a portion of said surface being porous, with pores having characteristics such that surface tension of said liquid supports said liquid in said reservoir when said liquid is at an initial temperature, and allows said liquid to drain through said pores when said liquid is at a temperature which approaches or is at a boiling point of said liquid, wherein a height of said liquid in said reservoir is proportional to a radius of each pore to support said liquid until said temperature approaches or is at a boiling point of said liquid; and
    a brewing basket below the reservoir for receiving brewing ingredients and liquid from said reservoir, said brewing basket being configured to receive a containment filter for said brewing ingredients, said brewing basket having at least one opening through which a beverage brewed in said brewing basket can escape.

2. The apparatus of claim 1, further comprising a receiving vessel for receiving a beverage brewed in said brewing basket.

3. The apparatus of claim 1, wherein said porous surface is at least mildly hydrophobic.

4. The apparatus of claim 1, wherein said pores have a size in the range of approximately 10 to 200 microns.

5. The apparatus of claim 1, wherein said porous surface is that of a portion of a lower wall of said brewing basket.

6. The apparatus of claim 5, wherein said portion of said lower wall has a thickness of substantially 0.75 mm.

7. The apparatus of claim 1, wherein said porous surface is integrally formed with other portions of said reservoir.

8. The apparatus of claim 1, wherein said porous surface is imbedded within said reservoir in a liquid impervious manner.

9. The apparatus of claim 1, wherein said porous surface comprises a hydrophobic porous medium embedded within another portion of said reservoir in a liquid impervious manner.

10. The apparatus of claim 1, in combination with a heater for heating the brewing liquid.

11. The apparatus as combined in claim 10, wherein said heater is one of an electrical resistance heater and a microwave oven.

12. An apparatus for brewing a beverage, comprising:
    a reservoir for receiving a brewing liquid and brewing ingredients for brewing a beverage, said reservoir having a surface, at least a portion of said surface being porous, with pores having characteristics so that surface tension of said liquid supports said liquid in said reservoir when said liquid is at an initial temperature, and allows said liquid to drain through said pores when said liquid is at a temperature which approaches or is at a boiling point of said liquid, wherein a height of said liquid in said reservoir is directly proportional to a radius of each pore to support said liquid until said temperature approaches or is at a boiling point of said liquid.

13. The apparatus of claim 12, further comprising a storage vessel for receiving beverage brewed in said reservoir.

14. A method for brewing a beverage, the method comprising:

placing brewing ingredients in a brewing basket, said brewing basket being configured to receive a containment filter for said brewing ingredients, said brewing basket having at least one opening through which a beverage brewed in said brewing basket can escape;

placing a reservoir for a brewing liquid over said brewing basket, said reservoir having a surface, at least a portion of said surface being porous with pores having characteristics so that surface tension of said liquid supports said liquid in said reservoir when said liquid is at an initial temperature, and allows said liquid to drain through said openings when said liquid approaches or reaches a boiling point of said liquid wherein a height of said brewing liquid in said reservoir is proportional to a radius of each pore to support said brewing liquid until said temperature approaches or is at a boiling point of said brewing liquid;

placing the brewing liquid in said reservoir;

heating the brewing liquid to a temperature approaching or at the boiling point of said brewing liquid to allow said brewing liquid to enter said brewing basket and mix with said brewing ingredients; and collecting brewed liquid in a receiving container.

15. The method of claim 14, wherein said portion of said container is comprised of a material which is at least mildly hydrophobic.

16. The method of claim 14, wherein said heating is accomplished with microwave energy.

17. The method of claim 14, wherein said heating is accomplished by placing said container in a microwave oven.

18. A method for brewing a beverage, the method comprising:

placing brewing ingredients in a brewing basket, the brewing basket being configured to receive a containment filter for the brewing ingredients, the brewing basket having at least one opening through which a beverage brewed in the brewing basket can escape;

placing a reservoir for a brewing liquid over the brewing basket, the reservoir having a surface, at least a portion of the surface being porous with pores having characteristics so that surface tension of the liquid supports the liquid in the reservoir when the liquid is at an initial temperature, and allows the liquid to drain through the openings when the liquid approaches or reaches a boiling point of the liquid;

placing the brewing liquid in the reservoir;

heating the brewing liquid to a temperature approaching or at the boiling point of the liquid to allow the liquid to enter the brewing basket and mix with the brewing ingredients, wherein the heating is accomplished by using an electrical resistance heater associated with the reservoir; and collecting brewed liquid in a receiving container.

19. A method for brewing a beverage, the method comprising:

placing brewing ingredients and a brewing liquid in a reservoir, said reservoir having a surface, at least a portion of said surface being porous, with pores having characteristics so that surface tension of said liquid supports said liquid in said reservoir when said liquid is at approximately room temperature, and allows said liquid to drain through said openings when said liquid approaches or reaches a boiling point of said liquid wherein a height of said brewing liquid in said reservoir is proportional to a radius of each pore to support said brewing liquid until said temperature approaches or is at a boiling point of said brewing liquid;

heating the liquid to a temperature approaching its boiling point; and collecting brewed liquid in a receiving container.

* * * * *